United States Patent [19]

Wayment

[11] 4,101,333
[45] Jul. 18, 1978

[54] METHOD OF MINE BACKFILLING AND MATERIAL THEREFOR

[75] Inventor: William Ross Wayment, Kitchener, Canada

[73] Assignee: Joy Manufacturing Company, Pittsburgh, Pa.

[21] Appl. No.: 799,422

[22] Filed: May 23, 1977

Related U.S. Application Data

[62] Division of Ser. No. 716,617, Aug. 19, 1976, Pat. No. 4,059,963.

[51] Int. Cl.² ............................ C04B 7/00; C04B 7/02
[52] U.S. Cl. ................................. 106/85; 61/35; 106/97
[58] Field of Search ............... 106/97, 85; 61/35, 36 B

[56] References Cited

U.S. PATENT DOCUMENTS

| | | | |
|---|---|---|---|
| 3,459,003 | 8/1969 | O'Neal | 61/35 |
| 3,508,407 | 4/1970 | Booth | 61/35 |
| 3,852,967 | 12/1974 | Stewart et al. | 61/35 |
| 4,059,963 | 10/1977 | Wayment | 61/35 |

FOREIGN PATENT DOCUMENTS 965,440  4/1975  Canada .................................. 106/97

*Primary Examiner*—Helen M. McCarthy

[57] ABSTRACT

A method of backfilling in underground mine operations by a mill tailings slurry which is dewatered to provide a material with a controlled water content to permit the dewatered material to be used as a backfill without requiring any substantial dewatering after placement and which material can, when desired, be mixed with selected quantities of cement to provide a mortar for backfilling or surface covering.

2 Claims, 1 Drawing Figure

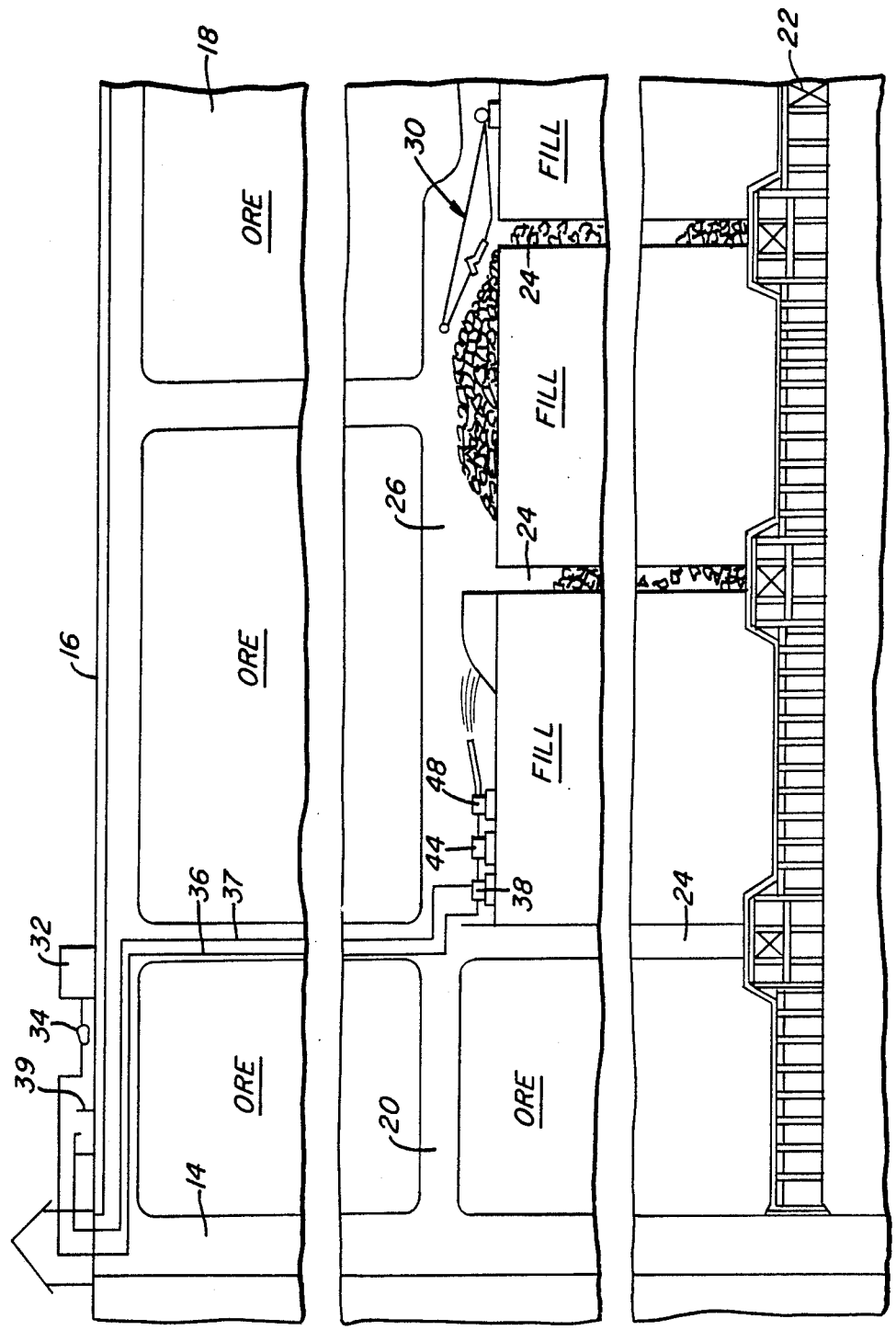

METHOD OF MINE BACKFILLING AND MATERIAL THEREFOR

This is a division of application Ser. No. 716,017, filed Aug. 19, 1976, now U.S. Pat. No. 4,059,963.

In mining it is well known to backfill excavated or mined out regions of an underground mine by transporting a slurry of sands or mill tailings having 40 to 70 percent solids, by weight, to the stope areas to be filled. Once in the stope the transport water of the slurry creates serious problems as the excess transport water in the backfill causes the backfill to have the characteristics of a large hydrostatic body which can exert a high, and sometimes excessive, pressure on the backfill retaining structures. Further the backfill is not utilizable in the mining operations until it has a consistency and strength to permit men and machines to be safely supported on the surface of the fill. At present such excess transport water is removed by elaborate decanting and draining operations which have presented problems in providing the dewatering structures, in cleaning the accumulations of slimes on the dewatering structures and the disposing of the removed excess water from within the mine. In addition, the rate of dewatering of prior slurries varies due to various factors such as the permeability and location of the fill such that men and machines are not supportable by the dewatering fill for a period of time which can vary from a day to a couple of weeks. Obviously such time delay can adversely effect the mine production. Other obvious problems are created when such slurries spill over or break the retaining structures.

It is also common practice to add cement to slurries prior to transporting the slurry to obtain a higher strength backfill. With the high percentage of transporting water a large percentage of the cement is retained in the water and accumulates in water pockets in the fill or runs off with the drain water so that the strength advantage for the amount of cement added is not obtained.

Still other prior hydraulic backfill systems have classified the mill tailings prior to forming the slurry to remove a selected percentage of the fine particles from the tailings, such as removing most of the particles smaller than 200 mesh, in order to provide a slurry in the nature of 40 to 70 percent solids by weight which is easier to dewater in place and reduce the expense associated with cleaning up slimes. Such systems obviously require the fines to be removed at the surface, however, slurries without such fine particles have other serious disadvantages in that transporting of larger particles causes higher abrasion in the transport system and higher friction losses since the fines content of a slurry functions as a transporting lubricant. A particular disadvantage in using classified tailings in a slurry is that more consolidation occurs with large particles than occurs with a slurry containing fines since classified tailings are poorly graded in that the size of particles are more uniform and unclassified tailings are well graded in that all sizes of particles are contained therein.

The various disadvantages of the prior backfilling techniques are characterized by the disadvantage that the method of mining and the rate of mining is controlled by the backfilling method employed. Also prior hydraulic backfilling systems have not proven practical for some mining methods.

The present invention employs a method of backfilling by dewatering a slurry of mill tailings after hydraulic transport into the mine but before placement of the fill material to produce a material having a controlled water content such that extensive dewatering of in-place fill is not required to quickly obtain a surface capable of supporting men and material. Also by mixing cement with the dewatered material the resultant material-cement mixture is a mortar that can be placed as desired without requiring subsequent dewatering. The mortar produced by the method of this invention is of a consistency of the mortar as is commonly employed in the building trades, however, it is not of the same composition as the mortar as used in the building trades. In addition, the present method utilizes unclassified mill tailings so that the resultant backfill material has a higher strength than dewatered material not including the fine particles. The method of the present invention also provides a backfill which is able to support men and machinery shortly after backfilling has been completed and which is not subject to reliquidification subsequent to placement.

Accordingly, one object of this invention is to provide a new and improved method of backfilling for underground mining operations.

Another object of this invention is to provide a new and improved material for use in backfilling in underground mining operations.

A more specific object of this invention is to provide a new and improved method of backfilling for underground mining operations utilizing mill tailings having a selected water content with which cement is mixed to provide a mortar.

Still another more specific object of this invention is to provide a new and improved method of backfilling for underground mining operations utilizing a mill tailings slurry in which the percentage of water removed is controlled to provide a material which can be used directly for backfilling.

These and other objects of this invention will become better understood upon consideration of the following detailed description of the method and material as is presently preferred with relation to one type of mining system shown in the drawing.

The drawing is a general schematic illustration of a typical mine employing a "cut and fill" mining system; however, it will be appreciated that mining systems follow bedded ore deposits as they occur in nature and therefore are not necessarily of the preciseness illustrated in the drawing. Backfilling is extensively used in "cut and fill" mining and accorgingly well illustrates a mining system to which the advantages of this invention are applicable. In the schematic illustration of a "cut and fill" mine a vertical main access shaft 14 extends downwardly from the earth's surface 16 to provide access to an underground in situ mineral ore deposit 18 via a plurality of vertically spaced drifts 20, only one of which is shown, extending generally horizontally from shaft 14 through the deposit 18 to define a respective plurality of vertically spaced levels in the mine. The drift at the lowermost level shown in the figure provides a main haulageway 22 which receives extracted ore from one or more mine levels thereabove via a plurality of suitably vertically extending ore passes 24 extending between the main haulageway and the various mining locations or stopes 26 from one or more of the overlying drifts 20.

In the conventional "cut and fill" mining the minieral ore is mined in any suitable manner such as by known mining machines or known drilling and blasting techniques from the upper end side portions of the stope 26 to obtain a quantity of broken or extracted ore 28 on the floor of stope 26 which mined ore is then transported in any suitable manner, such as by a conventional dragline slusher 30 as illustrated, into one of the ore passes 24 for subsequent gravitational delivery thereof to haulageway 22. As mining progresses the removal of ore continually relocates the upper portion of the stope 26 upwardly within the ore deposit 18 such that support must be provided for the walls of the stope 26 formed during such mining which were previously supported by the ore that has been removed. Accordingly, mining at any particular stope 26 location must be periodically interrupted for backfilling with a desired depth of fill material to elevate the floor of stope 26 to permit mining to continue.

Inasmuch as the mine layout for "cut and fill" mining and various mining methods may be employed to mine the ore deposit 18 as are well known in the art further description thereof is not necessary to the understanding of this invention. It is also well known that the extracted ore prior to the removal of its metals constituents, is crushed and ground such that after the metals have been extracted the non-metallic constituents are a waste by-product which is primarily a finely ground rock commonly referred to as mill tailings. As is also known such mill tailings are mixed with water in a slurry preparation means 32 to provide a slurry which slurry is pumped by a suitable pump 34 through a conduit 36 to the desired location for use within the mine. Although particle sizes in mill tailings vary due to the various metal extraction processes employed, a typical sample of mill tailings will be of minus 28 mesh having particles of 600 microns to sub-micron size therein. Further the water content, and obviously the solids content of the slurry will also vary dependent upon the parameters required to pump the slurry to its desired use location. With the method of this invention the incoming slurry is dewatered by a centrifugal separator 38 which is of a type to produce a backfill material of a composition and/or consistency as described hereinafter at a rate to permit the filling of the open area of the stope 26 at a rate consistent with the mining method desired.

Although the slurry is specified as being dewatered herein to provide the material of this invention it is to be understood that all water is not removed from the incoming slurry and that the backfill material discharged from the centrifuge has a water content which water content is controlled to provide a material of the proper consistency. A centrifuge of a structure and which is operable to provide such material discharge is more fully described, shown and claimed in copending patent application Ser. No. 720,200 the disclosure of which is incorporated herein for a better understanding of this invention. With the method of this invention the slurry is dewatered regardless of mill tailing. The water content of the slurry is selected with reference to the composition of mill tailings to be transported, the mechanical equipment available for such transporting and the physical system used to transport the slurry. Basically in a given situation only the water necessary to provide the most efficient transportation is used in the slurry; however, the water content of the slurry is not critical as long as sufficient water is used to permit the mill tailings to be transported to the desired location. A slurry water content of 30 to 70 percent by weight is satisfactory for transporting the slurry used in this invention. Also it is not essential in this invention that each and every solid particle be removed from the slurry; however, the solids content of the liquid discharge being returned to the surface in conduit 37 from the separator 38 is held to a practical minimum such as 5 percent by weight due to the operating parameters of a centrifuge as more fully set forth in application Ser. No. 720,200. Preferably the moist mill tailings discharge is mixed with a suitable quantity of cementituous material in a suitable mixer 44 to provide a mortar for backfilling. Thereafter such mortar is placed as desired in stope 26 in any suitable manner such as by a mortar pump 48 the discharge of which is deposited upon the top of the prior backfill between the walls of the stope 26 therebelow. Once in the stope 26 the mortar can be spread as desired by known devices such as the equipment used for spreading concrete. In other instances it is desirable to place the mortar overhead and/or on vertical walls within the mine which can be accomplished with suitable equipment such as that used in the shotcrete process. Thus, for the purposes of this invention the mortar is deposited at a consistency such that the mortar need not be supported to permit dewatering.

With this invention it is not essential that the mortar in place be void of any excess water since certain quantities of water can be handled by the known mine drainage systems. What is required is that the water content of the mortar be sufficiently low to permit the mortar to remain in place and stabilize without requiring the erection of supporting bulkheads or dewatering structures. Consequently the water content of the backfill material discharged from the separator 38 must be controlled inasmuch as the water content of such material will determine, disregarding the water absorbed during hydration by the added cement, the water content of the resultant mortar. Experimentation has established that the backfill material discharged from the separator 38 would have a water content not in excess of 17% to 25% by weight, with about 20% being preferable. Such 20% water content permits the backfill material to be discharged continuously from the separator 38 as a flowable homogenous mass. The amount of cement added to the discharge from the separator 38 can be varied as desired with the addition of a higher percentage of cement providing a higher strength mortar at an increased cost. For backfill purposes a 3% by weight addition of cement provides a satisfactory mortar. In instances where the mortar is placed on walls up to 20% by weight can be added and provide a mortar which, upon hardening, has a higher strength.

With such water content the mortar can be handled in the manner in which cements are presently handled both in placing the mortar and in working the mortar. Since the cement added is thoroughly mixed into the material discharged from the centrifuge there is a uniformity of mortar such that the resultant hardened material is uniform and capable of supporting men and machines without encountering soft or mushy areas. By mixing the cement with the discharged backfill material the cement coats the material to prevent cement migration as occurs when cement is added to a mill tailings slurry prior to transport. In particular by using unclassified tailings the entire range of particle sizes are utilized within the mortar with the primary advantage residing in the utilization of the fine particle to provide a higher density material. Such higher density is achieved since the fine particles become located between larger particles rather than having voids between larger particles. Voids between particles when under load, such as when machinery transverses such materials, crush the larger particles and permit the larger particles to disintegrate and fill such voids. Such void filling does provide a consolidated material; however, the surface of the material becomes uneven during use. Further until complete consolidation occurs the less dense material does not have the same homogeneousness as the mortar of this invention. By mixing the cement after dewatering the cement is dispersed throughout the mortar which dispersement coupled with the lower water content of the mill tailings discharge from the separator 38 provides a substantially higher strength backfill than the strength of the backfill of prior methods utilizing the same amount of cement. Alternatively, by so adding and mixing the cement less cement is used to obtain the same strength of backfill as is obtained with prior methods. As is known, cement hydrolyzes and during hydrolyzation absorbs water; accordingly, the adding of cement as described above reduces the water content of the mortar. Depending upon the resultant mortar strength desired the quantity of added cement is selected as desired, with reference to the free water available in the mortar. Thus, with the method of this invention by controlling the water content of the backfill material discharge from the separator 38 a mine operator can obtain different backfills having various structural characteristics to provide a wide latitude as to the manner in which the mortar can be used. Such latitude permits the mine operator to select a mining system dependent upon the materials produced by this invention rather than a system controlled by the laws of hydraulics. An operator can also control the water content of the mortar by adding additional cement in instances where there may be an excess of free water in the material discharged from the centrifuge. The mine operator has even more latitude as to the utilization of the mortar of this invention by using the various admixtures known in the use of cements such as accelerators and curing aids.

The liquid discharge from the separator 38 is transported to a suitable location for disposal as is known in the art. As shown, the liquid discharge is preferably returned to the surface by suitable means including a conduit 37 for discharge into a settling tank 39 to provide water for mixing with mill tailings as previously described. Settling tank 39 is preferred so that the solids content of the liquid discharge from the separator 38 can be easily separated from the return water.

Although the preferred embodiment of this invention utilizes cement the addition of cement is not essential to obtain a backfill material superior to the backfill materials presently being used in underground mining since the material discharged from the centrifuge has a low water content compared with the water content of slurries which are not dewatered prior to backfilling. Thus, as indicated, with a water content of from 17 to 25% by weight in the backfill material discharged such material can be used directly for backfilling without requiring the extensive dewatering and bulkheading presently employed. When cement is not to be added the mixer 44 is not employed. The advantages of using unclassified tailings, higher density of backfill, eliminating elaborate dewatering and bulkhead structures, and a shorter time period until the backfill can be utilized compared to present methods are still obtained; however, not necessarily to the same degree as is obtained by adding cement to the material discharged from the centrifuge.

Although a cut and fill mining system has been described the method and material of this invention are equally applicable to other mining systems such as the longwall systems utilized in South Africa at the present time. In such longwall systems the mined seam is backfilled to provide roof support for the miners at the face. Prior slurries, which are dewatered in place, present serious problems in providing adequate roof support which is minimized by the material and method of this invention due to the higher density of backfill material and the lower shrinkage of the material of this invention. In addition, the problems attendant with excess water in longwall seams are eliminated.

Although a preferred embodiment of the invention as presently contemplated has been described and shown and modifications thereof have also been described, those skilled in the art to which this invention relates will readily discern that the methods and materials of this invention can be utilized in numerous ways without departing from the spirit and scope of this invention as set forth in the following claims.

What is claimed is:

1. A structural material derived from a slurry of mill tailings and water with the water content being in the range of 35 to 70 percent by weight consisting of centrifugally dewatered, unclassified mill tailings of substantially uniform composition having a water content no greater than 25 percent by weight and preferably no more than 20 percent, which can be used directly for backfilling in underground operations.

2. A structural material as set forth in claim 1 additionally having a quantity of cement mixed therewith to produce a mortar.

* * * * *